3,311,595
PROCESS FOR THE MANUFACTURE OF LOW MOLECULAR WEIGHT HOMO- AND CO-POLYMERS OF VINYL ESTERS
Karl-Heinz Kahrs and Werner Ehmann, Frankfurt am Main, Germany, assignors to Farbwerke Hoechst Aktiengesellschaft vormals Meister Lucius & Bruning, Frankfurt am Main, Germany, a German corporation
No Drawing. Filed Oct. 23, 1962, Ser. No. 232,570
Claims priority, application Germany, Oct. 27, 1961, F 35,228
13 Claims. (Cl. 260—78.5)

The present invention relates to an improved process for the manufacture of low molecular weight homopolymers of vinyl esters, especially vinyl actate, and to copolymers thereof with other olefinically unsaturated compounds.

It is known that in the polymerization of vinyl esters, particularly vinyl acetate, products of low K-value, that is of low molecular weight can be obtained by using so-called chain terminators. As such chain terminators, low aliphatic aldehydes are generally used. The latter or their transformation or decomposition products can be removed only unsatisfactorily from the polymer after polymerization. The polymers so obtained are therefore unsuitable for applications that require products which are particularly pure, non-smelling and tasteless, for example the production of raw materials for chewing gum from vinyl acetate.

Experiments have therefore been carried through to find a process for the manufacture of polymers having a higher degree of purity. According to U.S. Patent 2,704,753, for example, vinyl acetate is polymerized in a mixture of water, special salts and ketones. These polymerization batches are difficult to work up. The salt must be washed out and the ketone removed thoroughly to avoid foreign odor and physiological complications.

It has also been proposed to make low molecular weight polyvinyl esters or copolymers of vinyl esters with other monomers by polymerization in organic solvents. The latter must be capable of being removed after polymerization and any traces which may be left behind must not unfavorably influence the odor. If the product is intended for the production of raw material for chewing gum, any possible traces of solvent must be physiologically unobjectionable. For this reason, ketones and aromatic substances are unsuitable.

In the case of lower aliphatic alcohols such as methanol, ethanol and n-propanol, the aforesaid disadvantages are not so pronounced. When these substances are used, it is difficult, however, to obtain low molecular weight polymers having K-values of down to 15 to 22 as are often required, or such a large amount of alcohol has to be used that considerable technical expenditure is required since the alcohols must be removed again.

The following table indicates the results obtained by the polymerization of vinyl acetate in alcohol in a weight ratio of 1:1 with the use of 0.1% by weight, calculated on the vinyl acetate, of azo-bis-isobutyronitrile as an activator.

Table

|  | K-value [1] |
|---|---|
| Methanol | 40 |
| Ethanol | 27 |
| n-Propanol | 27.5 |
| 1-butanol | 27 |
| Isopropanol | 20 |
| 2-butanol | 20 |
| 2-pentanol | 23.5 |

[1] K-values according to H. Fikentscher ("Cellulosechemie," vol. 13, page 58 (1932)), determined on a 1% solution of the polymer in ethyl acetate at 20° C.

Now we have found that vinyl ester polymers, i.e. homopolymers or copolymers of vinyl esters, having particularly low K-values can be obtained by polymerizing one or more vinyl esters, if desired together with other monomers capable of being copolymerized with vinyl esters, dissolved in one or more saturated monohydric secondary aliphatic alcohols having 3 to 8, advantageously 3 to 5 carbon atoms, at a temperature within the range of 40° to 90° C. under known conditions suitable for starting a polymerization. In accordance with the invention, a part of the monomer or monomer mixture is partially or completely polymerized in the alcoholic solution and then the bulk of the monomer or monomer mixture is gradually added to the batch as the polymerization proceeds. Examples of suitable solvents to be used in the process of the invention are 2-butanol, secondary pentanols, secondary hexanols, heptanols, secondary octanols, and advantageously isopropanol. Exemplary of vinyl esters to be polymerized by the process of the invention are esters of vinyl alcohol and monovalent saturated aliphatic carboxylic acids having 1 to 18 carbon atoms and esters of vinyl alcohol and monovalent aromatic carboxylic acids, for example, alkylated, preferably methylated or ethylated, benzoic acids, and advantageously vinyl acetate and vinyl benzoate.

Depending on the nature of the monomer and the desired molecular weight, 1 to 50%, advantageously 2 to 30%, of secondary alcohol is used, the percentage figures being calculated on the total weight of solvent and monomer.

The amount of monomer or monomer mixture to be added to the alcohol and to be polymerized to an initial degree or completely is within the range of 5 to 50% by weight, advantageously 8 to 20% by weight, of the total monomer.

The pronounced reduction of the molecular weight which can be obtained by the process of the invention is surprising since no appreciable change in molecular weight is obtained when the process is carried out in the same manner but with the use of other than secondary alcohols.

For example, when vinyl acetate is polymerized in the same amount of methanol, with the total amount of monomer being present in the alcohol from the outset (process A), a polymer having a K-value of 40 is obtained.

When, however, according to the above polymerization process, a part of the vinyl acetate is polymerized to an initial degree in the methanol and the remaining portion of monomer is then added batchwise or continuously (process B), a polymer having a K-value of 39 is obtained, that is the K-value is only insignificantly reduced.

In an analogous test using n-propanol, the polymer obtained by process A has a K-value of 27.6 and the polymer obtained by process B has a K-value of 27.7.

When isopropanol is used, however, process A yields a polymer having a K-value of 20 and process B yields a polymer having a K-value of 15.

When vinyl acetate is polymerized in n-propanol in a weight ratio of 7:3:

Process A yields a polymer having a K-value of 35.0 and Process B yields a polymer having a K-value of 33.5.

With isopropanol, the following values are obtained:

Process A—K-value 28
Process B—K-value 19.

The polymerization in a secondary alcohol may also be carried out in the presence of water. Up to 50% by weight of water, calculated on the alcohol, may be present without impairing the effect of the process of the invention. After polymerization, the secondary alcohol can be easily removed from the polymer in vacuo or with steam. The vinyl ester polymers obtained by the process of the invention, advantageously polyvinyl acetate, are substantially colorless, odorless and tasteless and thus meet high standards of purity. In this respect, as well as by their surprisingly low molecular weight, they differ essentially from polyvinyl esters obtained in low primary aliphatic alcohols. The latter polyvinyl esters have an unpleasant and often annoying odor which can especially be observed when the heated substances have been spread to form a thin film.

The vinyl ester polymers, advantageously polyvinyl acetate, obtained by the process of the invention have only few branched molecules, as is evidenced by the fact that very little decomposition occurs on saponification to polyvinyl alcohol.

Polyvinyl acetate which has been obtained by polymerization of vinyl acetate dissolved in isopropanol (weight ratio, isopropanol:vinyl acetate 1:1) according to process A and polyvinyl acetate obtained by polymerization of vinyl acetate dissolved in isopropanol (weight ratio, isopropanol:vinyl acetate 3:7) according to process B, have (with an almost identical K-value) substantially the same molecular weight distribution curve.

The process of the invention has also the following technically important advantage:

In the manufacture of some copolymers, for example in the manufacture of copolymers of vinyl acetate with maleic acid esters in bulk or in the form of beads, cross-linked and therefore only partially soluble polymers are obtained in many cases.

To obtain such copolymers with a relatively low molecular weight (for example K-values within the range of about 25 to 50) and good solubility, it has hitherto been necessary to carry out the polymerization in a large amount (about 30 to 50% by weight) of an organic solvent in order to avoid the said cross-linking. The process of the invention, however, permits the same effect with a very small amount of isopropanol, for example 2 to 6%, calculated on the total weight of solvent and monomers, to be obtained.

As catalysts for the polymerization according to the invention, there may be used those known for a free radical-initiated polymerization in substance or in organic solvents, for example diacyl peroxides or advantageously azo compounds, for example azoisobutyronitrile. Redox systems may also be used for the activation. As copolymer components for the vinyl acetate there may be used all compounds that are copolymerizable with vinyl esters, for example esters of fumaric or maleic acid and monohydric saturated aliphatic alcohols having 1 to 10, advantageously 2 to 8 carbon atoms, or crotonic acid. The copolymers obtained by the process of the invention should be built up to an extent of at least 50% by weight of vinyl esters, advantageously vinyl acetate or vinyl benzoate. The vinyl ester polymers obtained by the process of the invention may be advantageously used, for example, as a base for chewing gum material. They may also be used for many other fields of application, for example for painting systems having special properties.

In some cases it may be advantageous to carry out the polymerization in the presence of an inert gas, for example nitrogen.

The polymerization temperatures are generally within the range of 40° to 90° C. They may, however, be below that range if redox systems are used or may be higher, in which case it may be necessary to carry out the polymerization under pressure.

The following examples serve to illustrate the invention but they are not intended to limit it thereto.

*Example 1*

(a) In a four-necked flask provided with a stirrer, reflux condenser and thermometer, there were placed

| | Grams |
|---|---|
| Isopropanol | 150 |
| Vinyl acetate | 50 |
| Azoisobutyronitrile | 0.05 |

The mixture was polymerized for 1 hour at a bath temperature of 80° C. In the course of 5 hours, a solution of 0.3 gram azoisobutyronitrile in 300 grams vinyl acetate was then run in from a dropping funnel.

To complete the polymerization, the mixture was stirred for a further 2 hours at 80° C.

By distilling off the isopropanol, a substantially colorless, odorless and tasteless polyvinyl acetate was obtained which had a K-value of 19, determined on a 1% solution of the polymer in ethyl acetate.

(b) For comparison, a test according to process A was carried out. In an apparatus of the type described above there were placed

| | Grams |
|---|---|
| Vinyl acetate | 350 |
| Isopropanol | 150 |
| Azoisobutyronitrile | 0.35 |

The mixture was polymerized for 8 hours at a bath temperature of 80° C. The isopropanol was then distilled off in vacuo. A polyvinyl acetate having a K-value of 28 was obtained.

*Example 2*

In a four-necked flask provided with a stirrer, reflux condenser, dropping funnel and thermometer there were placed

| | Grams |
|---|---|
| Isopropanol | 80 |
| Water | 15 |
| Vinyl acetate | 40 |
| Azoisobutyronitrile | 0.04 |

The mixture was polymerized for 1.5 hours at an external temperature of 80° C. In the course of 6 hours, a solution of 0.36 gram azoisobutyronitrile in 360 grams vinyl acetate was then run in from the dropping funnel and the polymerization was terminated within a further 2 hours.

By distilling off the isopropanol and the water, an almost colorless polyvinyl acetate was obtained which was to a high degree tasteless and free from odor. The product had a K-value of 21.

*Example 3*

In a 5-liter vessel of stainless steel provided with a heating jacket, effective stirrer and reflux condenser there were placed

| | Grams |
|---|---|
| Isopropanol | 130 |
| Water | 20 |
| Vinyl acetate | 400 |
| Maleic acid dibutyl ester | 100 |
| Azoisobutyronitrile | 2.5 |

The mixture was stirred for 2 hours at a jacket temperature of 85° C. A solution of 17.5 grams azoisobutyronitrile in a mixture of 700 grams maleic acid dibutyl ester and 2800 grams vinyl acetate was then added in the course of 4 hours. After the temperature had risen above the temperature maximum of 95° C., the mixture was stirred for a further 2 hours at 85° C. and then the volatile constituents were drawn off in vacuo.

A slightly yellowish copolymer was obtained which dissolved in methanol, ethyl acetate and benzene to yield a clear solution and which had a K-value of 33.

*Example 4*

In a 5-liter vessel of stainless steel provided with a heating jacket, effective stirrer and reflux condenser there were placed

| | Grams |
|---|---|
| Isopropanol | 30 |
| Vinyl acetate | 320 |
| Crotonic acid | 25 |
| Maleic acid dibutyl ester | 150 |
| Azoisobutyronitrile | 2.5 |

The mixture was polymerized for 3 hours at a jacket temperature of 85° C. A mixture of

| | Grams |
|---|---|
| Vinyl acetate | 640 |
| Crotonic acid | 50 |
| Maleic acid dibutyl ester | 300 |
| Azoisobutyronitrile | 10 | was then added in the course of 8 hours.

To complete the polymerization, the temperature of the jacket was kept at 85° C. for a further 5 hours. Subsequently, the volatile constituents were distilled off with steam and the product was dried in vacuo.

The copolymer so obtained had a yellowish color and a K-value of 32. It was completely soluble in methanol, benzene, ethyl acetate and aqueous ammonia.

*Example 5*

In a 5-liter vessel of stainless steel provided with a heating jacket, effective stirrer and reflux condenser there were placed

| | | |
|---|---|---|
| Isopropanol | kilograms | 0.45 |
| Vinyl benzoate | do | 1 |
| Diacetyl peroxide | grams | 5 |

The mixture was stirred for 3 hours at a jacket temperature of 85° C. A solution of 7.5 grams diacetyl peroxide in 1.5 kilograms vinyl benzoate was then added in the coarse of 3 hours. By heating at 90° C. for a further 4 hours, the polymerization was terminated. The isopropanol was then distilled off in vacuo. A slightly yellow vinyl benzoate was obtained which dissolved in ethyl acetate to yield a clear solution and had a K-value of 13.

*Example 6*

In a 5-liter vessel of stainless steel provided with a heating jacket, effective stirrer and reflux condenser there were placed

| | | |
|---|---|---|
| Isopropanol | kilograms | 0.1 |
| Vinyl benzoate | do | 0.4 |
| Fumaric acid dibutyl ester | do | 0.1 |
| Dibenzoyl peroxide | grams | 2 |

The mixture was polymerized for 2 hours at a jacket temperature of 85° C. A mixture of

| | | |
|---|---|---|
| Vinyl benzoate | kilograms | 0.8 |
| Fumaric acid dibutyl ester | do | 0.2 |
| Dibenzoyl peroxide | grams | 4 | was then added in the course of 3 hours and the polymerization was terminated in the course of a further 4 hours at a jacket temperature of 90° C.

The isopropanol was distilled off in vacuo. A slightly yellow copolymer was obtained which had a K-value of 15.

We claim:

1. A process for the manufacture of a low molecular weight polymer from a preselected total amount of (A) monomer consisting essentially of 50 to 100 parts by weight of a vinyl ester monomer of a monovalent, saturated aliphatic acid of 1 to 18 carbon atoms or a vinyl ester monomer of benzoic acid or a lower alkyl-substituted benzoic acid, and (B) 0 to 50 parts by weight of a comonomer selected from the group consisting of crotonic acid, an ester of maleic acid or fumaric acid and a monohydric, saturated aliphatic alcohol or 1 to 10 carbon atoms, or a combination thereof, which comprises (1) prepolymerizing in a vessel 5 to 50 parts by weight of said total amount of monomer or said monomer and comonomer at a temperature of 40 to 95° C. with a free radical polymerization catalyst and in a 3 to 8 carbon secondary aliphatic alcohol or mixture thereof with up to 50% by weight water as solvent, the solvent being present in an amount of 1 to 50% by weight of the total solvent-monomer mixture, and (2) adding the remainder of said total amount of monomer or said monomer and comonomer to said vessel and completing polymerization of the total monomer added to said vessel in the initial solvent in said vessel.

2. The process as defined in claim 1 wherein the essential monomer is vinyl acetate.

3. The process as defined in claim 1 wherein vinyl acetate is homopolymerized.

4. The process as defined in claim 1 wherein vinyl acetate is copolymerized with maleic acid dibutyl ester.

5. The process as defined in claim 1 wherein vinyl acetate is copolymerized with maleic acid dibutyl ester and crotonic acid.

6. The process as defined in claim 1 wherein the essential monomer is vinyl benzoate.

7. The process as defined in claim 1 wherein vinyl benzoate is homopolymerized.

8. The process as defined in claim 1 wherein vinyl benzoate is copolymerized with fumaric acid dibutyl ester.

9. The process as defined in claim 1 wherein the solvent is a secondary aliphatic alcohol of 3 to 5 carbon atoms.

10. The process as defined in claim 1 wherein the solvent is isopropanol.

11. The process as defined in claim 1 wherein the solvent is a combination of isopropanol and water.

12. The process as defined in claim 1 wherein 8 to 20 parts by weight to the total amount of monomer or monomer and comonomer are prepolymerized in the first recited step.

13. The process as defined in claim 1 wherein the second recited step is begun before the prepolymerization in the first step is complete.

References Cited by the Examiner

UNITED STATES PATENTS

| 2,584,306 | 2/1952 | Theobald | 260—78.5 XR |
| 2,610,360 | 9/1952 | Cline et al. | 260—89.1 |
| 3,087,893 | 4/1963 | Aguis et al. | 260—78.5 |

FOREIGN PATENTS 261,406 8/1927 Great Britain.

JOSEPH L. SCHOFER, *Primary Examiner.*

JAMES A. SEIDLECK, L. WOLF, L. G. CHILDERS, *Assistant Examiners.*